United States Patent [19]

Higuchi et al.

[11] 4,307,206

[45] Dec. 22, 1981

[54] UREA-FORMALDEHYDE RESIN ADHESIVE

[75] Inventors: Mitsuo Higuchi; Isao Sakata, both of Fukuoka, Japan

[73] Assignees: Oshika Shinko Co., Ltd., Tokyo; Mitsuo Higuchi; Isao Sakata, both of Fukuoka, all of Japan

[21] Appl. No.: 166,257

[22] Filed: Jul. 7, 1980

[30] Foreign Application Priority Data

Jul. 10, 1979 [JP] Japan ................... 54-86417

[51] Int. Cl.$^3$ .................... C08L 61/24; C08K 3/40

[52] U.S. Cl. .......................................... 525/4; 260/38; 260/39 SB; 428/528; 428/529; 525/498; 525/515; 525/936

[58] Field of Search .................... 260/39 SB; 528/259; 525/4, 498, 515, 934, 936

[56] References Cited

U.S. PATENT DOCUMENTS 3,701,743  10/1972  Horowitz et al. ................. 525/498

Primary Examiner—Theodore E. Pertilla

[57] ABSTRACT

A urea-formaldehyde resin adhesive comprising a powder of a substance having the property of gradually reacting with an acid and thus consuming the acid.

6 Claims, No Drawings

UREA-FORMALDEHYDE RESIN ADHESIVE

This invention relates to a urea-formaldehyde resin adhesive having improved water resistance.

Urea-formaldehyde resin (to be abbreviated as urea resin hereinbelow) adhesives are used in the greatest quantities in the wood industry in Japan because they are relatively inexpensive and have superior operability as demonstrated by the fact that they permit bonding by pressing at relatively low temperatures within short periods of time. The urea resin adhesives, however, suffer from the defect that their water resistance is much lower than phenol-formaldehyde resin (to be abbreviated as phenol resin) adhesives or melamine-formaldehyde resin (to be abbreviated as melamine resin) adhesives. Because of this defect, products made by using urea resin adhesives, such as plywoods, cannot withstand use outdoors or in places having a high humidity.

Efforts have heretofore been made to improve the water resistance of urea resin adhesives by adding melamine, resorcinol or phenol to the urea resin during its manufacture or during its use as an adhesive to co-condense it with the urea resin. These expedients, however, have their own problems. For example, when melamine is added to the urea resin to increase its water resistance so that it can be used as an adhesive for plywoods of waterproof grade (plywoods found to be acceptable in a cyclic boiling test; to be referred to as type I plywoods), the amount of the melamine added must be increased (for example, to at least 1 mole per 2 moles of the urea resin). This naturally results in a high cost of the product, and hot press must be performed at higher temperatures for long periods of time. Resorcinol, on the other hand, is expensive, and the urea resin having resorcinol added thereto has poor storage stability and a short pot life. Addition of phenol to the urea resin poses similar problems to the case of adding melamine, and disposal of the remaining or wasted glue is difficult.

The aforesaid means are based on the principle that the water resistance of the urea resin is increased by changing the composition of the resin, and the skeleton of the urea resin having poor water resistance is reinforced by the melamine, resorcinol or phenol resin having good water resistance. Hence, the degree of increase of water resistance depends upon the amount of the material added. Consequently, attempts to obtain higher water resistance result in a smaller proportion of urea in the adhesive, and thus in a loss of the inherent low cost and superior operability of the urea resin.

It is an object of this invention to improve greatly the water resistance of a urea resin adhesive without impairing its characteristic properties by eliminating the cause of reducing the water resistance of the urea resin.

In order for the urea resin adhesive to exhibit high strength, the resin must cure fully. Because curing of the urea resin is very slow under neutral conditions, it is the practice to accelerate curing by increasing the concentration of a hydrogen ion which is a catalyst for the condensation reaction (namely, by decreasing the pH). For this purpose, an acidic curing agent such as ammonium chloride is usually added to the urea resin adhesive.

The hydrogen ion, however, acts as a catalyst not only for the condensation reaction but also for a hydrolyzing reaction of the resin which is reverse to the condensation reaction. It is presumed therefore that the acid based on the curing agent remaining in the urea resin adhesive layer after the curing operation promotes the hydrolysis of the cured resin to reduce the water resistance of the urea resin markedly. The present inventors actually determined to what extent the remaining acid would reduce the water resistance of the urea resin by using a plywood produced by using a urea resin adhesive for plywoods of water resistance grade (plywoods found acceptable in a hot water soaking test; to be referred to as type II plywoods). This revealed the following fact.

When a test specimen of an ordinary type II plywood is soaked in boiling water, delamination naturally occurs from the adhesive layer (glue line) in 0.5 to 2 hours. But when the plywood specimen is first dipped in an aqueous solution of sodium bicarbonate to neutralize the remaining acid in the adhesive layer completely and then soaked in boiling water, spontaneous delamination from the adhesive layer does not occur for more than 4 days.

It is anticipated therefore that if the acid can be removed from the cured resin, the water resistance of the urea resin adhesive will be greatly increased.

The present inventors extensively investigated the method of removing the acid in the cured resin. As a result, they could achieve the object of this invention of increasing the water resistance of the urea resin adhesive without impairing its inherent properties by adding to the urea resin adhesive a substance (to be referred to as an additive) which gradually reacts with the acid without hampering the curing of the resin and consumes the acid.

The urea resin adhesive of this invention includes not only those for ordinary type II plywoods, but also modified urea resin adhesives comprising urea as a main solid component (in an amount of at least 2 moles per mole of melamine, resorcinol or phenol) modified with melamine, resorcinol or phenol).

Effective additives for use in this invention are those having reactivity corresponding to the rate of formation of an acid in the adhesive (for example, when ammonium chloride is used as a curing agent for the urea resin, hydrochloric acid forms in the adhesive as a result of reaction of ammonium chloride with formaldehyde), namely those which react with the acid such that during the progress of the curing reaction, a predetermined amount of the acid is retained in the resin.

Since the rate of formation of hydrochloric acid varies according to the composition of the adhesive, the amount of ammonium chloride added and the curing temperature, it is possible to determine the type and amount of the additive according to these factors.

The present inventors investigated the rate of formation of hydrochloric acid using urea resin adhesives now used in Japan for ordinary type II plywoods. It was found that when 1% of ammonium chloride was added to the adhesive, the rate of formation of hydrochloric acid at 50° C. was $(0.5-2) \times 10^{-3}$ mole/liter.min. at a time when the concentration of hydrochloric acid has reached 0.02 N (corresponding to the pH of the adhesive of about 3), and that the rate of formation of hydrochloric acid increased to about 3 times when the reaction temperature rose by 10° C.

The rate of reaction of the additive with the acid can be presumed from the above rate of formation of hydrochloric acid. Thus, when 10 to 20 parts of the additive is added to the adhesive, the rate of consumption of the acid per gram of the additive is $(1-30) \times 10^{-6}$ mole/min.

at 50° C., and $(2-60)\times 10^{-4}$ mole/min. at 100° C. Accordingly, if a substance which reacts with the acid at such a moderate rate is added, the pH is maintained at about 3 for a certain period of time during the proceeding of the curing reaction for the adhesive, and then the pH gradually increases. Consequently, after the curing of the adhesive, the acid will be neutralized.

The amount of the additive used in this invention, as described hereinabove, is determined by the composition of the urea resin and the curing agent or the curing temperature or the type and form of the additive, etc. Usually, the amount of the additive is 5 to 50 parts by weight, preferably 5 to 35 parts by weight, per 100 parts by weight of the urea resin.

The additive used in this invention may be inorganic or organic substances which have the aforesaid rate of acid consumption and do not impair the properties of the urea resin adhesive. Alkaline substances which instantaneously react with acids, such as sodium carbonate, calcium carbonate or calcium silicate, or such alkaline substances as glass or natural minerals whose reaction with acids is too rapid may also be used as the additive in this invention if they are converted to substances which react with acids at moderate rates, by coating the surfaces of these fine particles with a polymeric substance, etc. to make so-called microcapsules.

Examples of especially suitable additives for use in this invention are alkali glass powders and microcapsules of alkaline substances given below.

(A) Alkali glass powders

Micropulverization of glasses having the composition of the general formula $(X_2O)_x(YO)_y(SiO_2)(B_2O_3)_2-(Al_2O_3)_n$ (wherein X represents an alkali metal, Y represents an alkaline earth metal, $x=0.05-0.5$, $y=0.05-0.5$, $z=0-0.5$, $n=0-0.2$) gives glass powders which react with acids at a moderate rate. The rate of reaction of these glass powders with acids can be changed freely by adjusting the glass composition. The rate of reaction of these glass powders with acids can also be adjusted by changing the size or amount of the glass particles. Glass containing an aluminum component is advantageous because it can be easily pulverized. Glasses having the composition of the above general formula wherein $X=Na$, $Y=Ca$, $x=0.05-0.5$, $y=0.05-0.5$, $z=0-0.3$, and $n=0-0.2$, especially those of the general formula wherein $X=Na$, $Y=Ca$, $x=0.15-0.4$, $y=0.15-0.4$, $z=0-0.2$ and $n=0-0.1$, are preferred because the starting materials are cheap, they can be produced at relatively low temperatures, they can be easily pulverized, and they have moderate reactivity with acids, etc. Inclusion of small amounts of other metal components in the glasses is not detrimental.

(B) Microcapsules of alkaline substances

These microcapsules are prepared, for example, by dipping a powder of calcium silicate in a concentrated solution of a polyalkylene polyamine, removing the liquid, and suspending the residue in acetone, and adding a polyisocyanate to the suspension to form a film of polyurea; or by causing a water-soluble radical polymerization initiator such as ammonium persulfate to be adsorbed to a powder of calcium carbonate, suspending the product in a nonpolar solvent, and adding a monomer such as vinyl acetate to perform polymerization and thus prepare a polymeric film. As the alkaline substance, sodium carbonate, glass (for example, alkaline glass having the composition of the above general formula in which x and/or y is larger than 0.5) showing stronger alkalinity than those of the above general formula, basic natural minerals, cured products of alkaline phenol resins, cured products of melamine resins, and mixtures of any of these can be used in addition to the above-cited calcium silicate and calcium carbonate. Low-molecular-weight and high-molecular-weight urethanes can be cited as other examples of preferred additives in the present invention. These urethanes undergo hydrolysis with acids to form amines and alcohols, and the resulting amines neutralize acids. Accordingly, those urethanes which have moderate reactivity may be used as the additive in this invention.

There is no particular restriction on the particle size (average particle size) of the additive. But usually it has a particle diameter of 0.1 to 80 microns, preferably 0.1 to 60 microns, especially preferably 0.5 to 50 microns. The particles of the additive may be in any form such as spheres, fibers or plates.

The additive may be added before or during use of the adhesive.

When the above additive is incorporated in accordance with this invention, ordinary urea resin adhesives for type II plywoods can give type I plywoods. Furthermore, by using a urea-phenol-formaldehyde condensation resin (phenol-modified urea resin) adhesive (having a minor proportion of phenol), plywoods which meet the "structural plywood standard" of JAS (Japanese Agricultural Standards) can be produced. Such a marked effect of increasing water resistance is illustrate by specific numerical values in Examples 1 to 4 given hereinbelow.

By the addition of the additive in accordance with this invention, gellation of the urea resin adhesive becomes slow at low temperatures, and therefore, the pot life of the glue becomes longer. This can be shown, for example, by variations in the gellation time with temperature in the glue recipe in Example 1, Run No. 6 given hereinbelow which contains, or does not contain, an alkali glass powder, as shown in Table 1 below.

TABLE 1

|  | 20° C. | 30° C. | 40° C. | 50° C. | 60° C. | 70° C. |
|---|---|---|---|---|---|---|
| Containing glass powder | 270 min. | 180 min. | 57 min. | 18 min. | 5.8 min. | 1.8 min. |
| Not containing glass powder | 145 min. | 55 min. | 20.8 min. | 8.0 min. | 3.1 min. | 1.2 min. |

As can be seen from the above table, the gellation of the glue becomes exceedingly slow at low temperatures and the pot life is prolonged, by the addition of the alkali glass powder. However, as the temperature increases, the gellation speed of the glue containing an alkali glass powder approaches that of the glue containing no alkali glass powder. Accordingly, in using the urea resin adhesive of this invention, there is no need to change the hot press conditions usually employed for curing of the urea resin adhesive, such as the temperature and time.

The above example refers to the use of alkali glass powder as the additive. A similar effect will also be obtained with other additives if the rate of their reaction with acids is moderate.

Disposal of the remaining or wasted glue (by washing, etc.) in the case of using the urea resin adhesive has been investigated, but it has been ascertained that no trouble occurs by the addition of the additive.

The following Examples illustrate the present invention more specifically. It should be understood however, that the invention is in no way limited by these specific examples.

In these Examples, various shear strengths have been measured in accordance with the following testing methods.

(1) Dry bonding test

The shear strength of a plywood specimen was measured in a normal condition.

(2) Hot water soaking test

A plywood specimen was dipped in hot water at 60±3° C. for 3 hours, and then dipped in water at room temperature until its temperature reaches room temperature. The shear strength of the specimen in the wet state was measured.

(3) 4-Hour boiling test

A plywood specimen was dipped in boiling water for 4 hours, and then dipped in water at room temperature until the temperature of the specimen reached room temperature. The shear strength of the specimen in the wet state was measured.

(4) Cyclic boiling test

A plywood specimen was dipped in boiling water for 4 hours, and dried at a temperature of 60±3° C. for 20 hours. It was further dipped in boiling water for 4 hours, and dipped in water at room temperature until its temperature reached room temperature. The shear strength of the specimen in the wet state was measured.

(5) Continuous 72-hour boiling test

A plywood specimen was continuously dipped for 72 hours in boiling water, and dipped in water at room temperature until its temperature reached room temperature. The shear strength of the specimen in the wet state was measured.

EXAMPLE 1

A glue was prepared by mixing 100 parts by weight of a standard urea resin adhesive for type II plywoods (formaldehyde/urea mole ratio=1.7:1; dry solids content=48%., gellation time=8 minutes at 50° C. when adding 1% of $NH_4Cl$) with 8 to 35 parts by weight of an alkali glass powder having an average particle size of 1 to 35 microns, an acid consumption rate at 50° C. of $(1-30) \times 10^{-6}$ mole/min./g of glass, and the composition of general formula $(X_2O)_x(YO)_y(SiO_2)(B_2O_3)_z(Al_2O_3)_n$ (wherein X is Na, Y is Ca and x, y, z and n are as shown in Runs Nos. 1 to 17 in the following Table 2), 5 parts by weight of wheat flour and 5 parts by weight of a 20% aqueous solution of ammonium chloride.

The resulting glue was coated at a rate of 150 g/m$^2$ on both surfaces of a 1 mm-thick lauan veneer, and a 1 mm-thick lauan veneer was superimposed on both coated surfaces to make a 3-ply structure. The 3-ply structure was cold-pressed at 10 kg/cm$^2$ for 15 minutes, and then heat-bonded for 2.5 minutes by a hot press maintained at 110° C. under a pressure of 10 kg/cm$^2$.

The resulting plywood was tested for shear strength and the results are shown in Table 2.

TABLE 2

| | Composition of alkali glass (moles) | | | | | Average particle size of alkali glass powder (microns) | Amount of the alkali glass (parts by weight) | Average shear strength | | | |
|---|---|---|---|---|---|---|---|---|---|---|---|
| | | | | | | | | (1) Normal condition | (2) Hot water soaking | (3) Boiling (4 hrs) | (4) Cyclic boiling |
| Run No. | x (Na$_2$O) | y (CaO) | z (B$_2$O$_3$) | n (Al$_2$O$_3$) | (SiO$_2$) | | | | | | |
| Invention | | | | | | | | | | | |
| 1 | 0.20 | 0.16 | — | — | 1.0 | 15 | 20 | 17.8 | 16.9 | 10.1 | 8.0 |
| 2 | 0.24 | 0.20 | — | — | 1.0 | 20 | 15 | 18.3 | 17.4 | 12.0 | 9.0 |
| 3 | 0.25 | 0.28 | — | — | 1.0 | 20 | 20 | 18.0 | 17.5 | 10.1 | 8.1 |
| 4 | 0.27 | 0.20 | — | — | 1.0 | 35 | 10 | 19.4 | 18.7 | 12.2 | 8.8 |
| 5 | 0.31 | 0.21 | — | — | 1.0 | 30 | 8 | 17.9 | 15.7 | 10.4 | 7.6 |
| 6 | 0.20 | 0.20 | 0.02 | — | 1.0 | 1 | 15 | 18.8 | 18.5 | 14.0 | 9.5 |
| 7 | 0.24 | 0.17 | 0.02 | — | 1.0 | 20 | 20 | 18.7 | 17.8 | 10.7 | 9.2 |
| 8 | 0.29 | 0.25 | 0.06 | — | 1.0 | 5 | 20 | 19.3 | 18.7 | 12.3 | 9.3 |
| 9 | 0.28 | 0.24 | 0.08 | — | 1.0 | 2 | 15 | 19.0 | 18.2 | 13.5 | 11.5 |
| 10 | 0.30 | 0.25 | 0.09 | — | 1.0 | 2 | 15 | 17.8 | 16.7 | 11.8 | 8.2 |
| 11 | 0.25 | 0.21 | 0.16 | — | 1.0 | 5 | 20 | 18.5 | 17.3 | 10.6 | 8.4 |
| 12 | 0.16 | 0.17 | — | 0.08 | 1.0 | 1 | 20 | 17.6 | 16.9 | 10.0 | 7.5 |
| 13 | 0.12 | 0.10 | — | — | 1.0 | 1 | 35 | 17.5 | 15.0 | 7.5 | 3.7 |
| 14 | 0.07 | 0.14 | — | 0.13 | 1.0 | 5 | 20 | 17.8 | 15.7 | 8.6 | 4.5 |
| 15 | 0.10 | 0.09 | 0.05 | 0.12 | 1.0 | 2 | 30 | 18.0 | 15.3 | 8.4 | 4.2 |
| 16 | 0.48 | 0.41 | — | — | 1.0 | 50 | 5 | 16.4 | 13.8 | 7.6 | 3.4 |
| 17 | 0.48 | 0.45 | 0.27 | — | 1.0 | 35 | 5 | 18.7 | 14.2 | 8.1 | 3.8 |
| Comparison | | | | | | | | | | | |
| 18 | 0.03 | 0.05 | — | — | 1.0 | 2 | 30 | 17.0 | 11.8 | *0 | *0 |
| 19 | 0.08 | — | 0.32 | 0.02 | 1.0 | 35 | 35 | 18.1 | 12.0 | *0 | *0 |
| 20 | 0.60 | 0.30 | — | — | 1.0 | 35 | 5 | 12.9 | 6.4 | *0 | *0 |
| 21 | 0.60 | 0.55 | — | — | 1.0 | 50 | 8 | 12.1 | 5.7 | *0 | *0 |
| 22 | — | — | — | — | — | — | 0 | 17.5 | 13.4 | *0 | *0 |

*Spontaneous delamination occured at the adhesive layer after boiling for 0.5 to 2 hours.

Since the alkali glass powders added in Runs Nos. 1 to 17 had the property of reacting with acids at moderate rates, the urea resin adhesives could withstand boiling. In particular, the urea resin adhesives having the alkali glass powders in Runs Nos. 1 to 12 added thereto exhibited water resistance such that it met the standards of type I plywood (cyclic boiling test).

In contrast, the urea resin adhesives containing the alkali glass powders in Runs Nos. 18 to 21 having the compositions outside the range specified in this invention and the urea resin adhesive not containing the alkali glass powder (Run No. 22) gave plywoods which underwent spontaneous delamination from the adhesive layer after boiling for 0.5 to 2 hours.

EXAMPLE 2

A glue was prepared by mixing 100 parts by weight of a urea-phenol-formaldehyde condensation resin adhesive (urea:phenol:formaldehyde mole ratio=3:1:7) with 15 parts by weight of alkali glass powders having an average particle size of 1 to 2 microns, an acid consumption rate at 50° C. of $(5-20)\times10^{-6}$ mole/min/g of glass and the compositions of general formula (in which X is Na, Y is Ca and x, y, z and n are as shown in Runs Nos. 23 to 25 in Table 3 below), 5 parts by weight of wheat flour and 5 parts by weight of a 20% aqueous solution of ammonium chloride.

The glue was coated at a rate of 150 g/m² on both surfaces of a 1 mm-thick lauan veneer, and a 1 mm-thick lauan veneer was superimposed on the coated surfaces to make a 3-ply structure. The 3-ply structure was cold pressed at 10 kg/cm² for 15 minutes, and then heat-bonded for 2.5 minutes by a hot press maintained at 120° C. under a pressure of 10 kg/cm² to produce a plywood.

The plywood was tested for shear strength.

The results are shown in Table 3.

TABLE 3

| | Composition of alkali glass (moles) | | | | | Average particle size of alkali glass (microns) | Amount of the alkali glass (parts by weight) | Average shear strength (kg/cm²) | | |
|---|---|---|---|---|---|---|---|---|---|---|
| | x | y | z | n | | | | (1) Normal condition | (4) Cyclic boiling | (5) 72-hour continuous boiling |
| Run No. | (Na₂O) | (CaO) | (B₂O₃) | (Al₂O₃) | (SiO₂) | | | | | |
| 23 | 0.22 | 0.20 | 0.02 | — | 1.0 | 1 | 15 | 18.7 | 14.0 | 11.7 |
| 24 | 0.28 | 0.24 | 0.08 | — | 1.0 | 2 | 15 | 19.2 | 13.8 | 11.4 |
| 25 | 0.30 | 0.25 | 0.09 | — | 1.0 | 2 | 15 | 18.5 | 13.6 | 11.0 |

It is seen from the above results that according to this invention, a marked increase in water resistance can be obtained.

When a plywood was produced in the same way as above except that the alkali glass powder was not added to the urea resin adhesive, the plywood showed spontaneous delamination at the adhesive layer within 24 hours in a continuous boiling test.

EXAMPLE 3

A glue was prepared by mixing 100 parts by weight of a standard urea resin adhesive for type II plywood (formaldehyde:urea mole ratio=1.8:1; dry solids content 48%; gellation time=4 minutes at 50° C. in the case of adding 1% of NH₄Cl) with 10 to 20 parts by weight of an alkali glass powder having an average particle size of 1 to 2 microns, an acid consumption rate at 50° C. of $(2-20)\times10^{-6}$ mole/min./g of glass and the composition of the above general formula (in which X is Na or K, Y is Ca, Mg or Ba, and x, y, z and n are as shown in Runs Nos. 26 to 28 in Table 4), 5 parts by weight of wheat flour and 5 parts by weight of a 20% aqueous solution of ammonium chloride.

The resulting glue was coated at a rate of 150 g/m² on both surfaces of a 1 mm-thick lauan veneer, and a 1 mm-thick lauan veneer was superimposed on both coated surfaces to form a 3-ply structure. The 3-ply structure was cold-pressed at 10 kg/cm² for 15 minutes, and then heat-bonded for 2.5 minutes by a hot press maintained at 110° C. under a pressure of 10 kg/cm².

The plywood was tested for shear strength, and the results are shown in Table 4.

TABLE 4

| | Composition of alkali glass (moles) | | | | | | | Average particle size of the alkali glass (microns) | Amount of the alkali glass (parts by weight) | Average shear strength (kg/cm²) | | | |
|---|---|---|---|---|---|---|---|---|---|---|---|---|---|
| | x | | y | | | z | n | | | | (1) Normal condition | (2) Hot water soaking | (3) 4-Hour boiling | (4) Cyclic boiling |
| Run No. | (Na₂O) | (K₂O) | (CaO) | (MgO) | (BaO) | (B₂O₃) | (Al₂O₃) | (SiO₂) | | | | | | |
| 26 | — | 0.15 | 0.20 | — | — | — | — | 1.0 | 1 | 20 | 17.7 | 15.8 | 9.3 | 7.8 |
| 27 | 0.23 | — | — | 0.28 | — | — | — | 1.0 | 1 | 20 | 18.7 | 16.4 | 10.7 | 8.2 |
| 28 | 0.23 | — | — | — | 0.07 | — | — | 1.0 | 2 | 10 | 17.0 | 15.0 | 8.4 | 6.1 |

It is seen from Table 4 that excellent water resistance was obtained in this Example, too.

When a plywood was produced by using a glue prepared in the same way as above except that the alkali glass powder was not added, the resulting plywood showed spontaneous delamination from the adhesive layer by boiling it for 1 hour.

EXAMPLE 4

A glue was prepared by mixing 100 parts by weight of a urea resin adhesive for type II polywoods (formaldehyde:urea mole ratio=1.65:1, dry solids=49%; gellation time=9 minutes at 50° C. in the case of adding 1% of NH₄Cl) with 10 parts by weight of microcapsules of calcium silicate (obtained by surface-coating a fine powder of calcium silicate with polyurea, and having a rate of acid consumption at 50° C. of $15+10^{-6}$ mole/min./g of glass and an average particle size of 1.5 microns), 5 parts by weight of wheat flour and 5 parts by weight of a 20% aqueous solution of ammonium chloride.

The glue was coated at a rate of 150×g/m² on both surfaces of a 1 mm-thick lauan veneer, and a 1 mm-thick lauan veneer was superimposed on both coated surfaces to form a 3-ply structure. The 3-ply structure was cold-pressed at a pressure of 10 kg/cm² for 15 minutes, and then heat-bonded for 2.5 minutes by a hot press maintained at 110° C. under a pressure of 10 kg/cm² to form a plywood.

The shear strength of the plywood was measured, and the results are shown in Table 5.

TABLE 5

|  | Average shear strength (kg/cm²) | Average wood failure (%) |
|---|---|---|
| (1) Normal condition | 20.5 | 100 |
| (2) Hot water soating | 19.0 | 100 |
| (3) Cyclic boiling | 9.0 | 10 |

When a plywood was prepared by using a glue prepared in the same way as above except that the microcapsules were not added, the resulting plywood showed spontaneous delamination from the adhesive layer after boiling for 1.5 hours.

As can be seen from the above Examples, the water resistance of the urea resin adhesive can be greatly increased without impairing the operability of the adhesive at relatively low temperatures for a short period of time and the effect of the resin as an adhesive by using a substance capable of reacting with acids at moderate rates as additive for the urea resin adhesive.

To sum up, the following advantages can be obtained by this invention by a simple operation of adding to the urea resin adhesive a substance capable of gradually reacting with acids.

(1) A plywood which meets the standard of type I plywood can be produced by using an ordinary urea resin adhesive for type II plywoods.

(2) A plywood which meets the "structural plywood standard" of JAS can be produced by using a phenol-modified urea-formaldehyde resin having a low phenol content.

(3) The pot life of the glue is prolonged.

(4) Acid degradation of the wooden part of bonded wood products can be prevented, and the life of the products can be prolonged.

What we claim is:

1. A urea-formaldehyde resin adhesive containing a sufficient amount of a powder of an acid reacting substance to react with substantially all acid in said resin adhesive as it forms during curing of said adhesive, said powder being selected from the group consisting of
   (i) a powder of an alkali glass having a composition of the formula $(X_2O)_x(YO)_y(SiO_2)(B_2O_3)_z(Al_2O_3)_n$ wherein X represents an alkali metal, Y represents an alkaline earth metal, x and y each independently represent a a number of from 0.05 to 0.5, z represents a number of from 0 to 0.5, and n represents a number of from 0 to 0.2, and
   (ii) microcapsules containing a powder of an alkaline substance.

2. The adhesive of claim 1 wherein the amount of the powder of said substance is 5 to 50 parts by weight per 100 parts by weight of a urea-formaldehyde resin.

3. The adhesive of claim 1 wherein the powder of said substance has an average particle size of 0.1 to 80 microns.

4. The adhesive of claim 1 wherein said alkaline substance is calcium silicate, calcium carbonate, sodium carbonate, glass having stronger alkalinity than the alkali glass of the above formula, a basic natural mineral, a cured product of an alkaline phenol resin, a cured product of a melamine resin, or a mixture of any of these.

5. The adhesive of claim 1 wherein said alkali glass has the composition of the general formula in which X represents sodium, Y represents calcium, x represents a number of from 0.05 to 0.5, y represents a number of from 0.05 to 0.5, z represents a number of from 0 to 0.3, and n represents a number of from 0 to 0.2.

6. The adhesive of claim 1 wherein said alkali glass has the composition of the general formula in which X represents sodium, Y represents calcium, x represents a number of from 0.15 to 0.4, y represents a number of from 0.15 to 0.4, z represents a number of from 0 to 0.2, and n represents a number of from 0 to 0.1.

* * * * *